United States Patent
Cheng (10) Patent No.: US 9,066,312 B2
(45) Date of Patent: *Jun. 23, 2015

(54) MOBILE COMMUNICATION DEVICES AND LOCATION REGISTRATION METHODS

(75) Inventor: Tsung-Yo Cheng, New Taipei (TW)

(73) Assignee: ACER INCORPORATED, Xizhi Dist., New Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 13/612,876

(22) Filed: Sep. 13, 2012

(65) Prior Publication Data

US 2013/0005335 A1 Jan. 3, 2013

Related U.S. Application Data

(63) Continuation-in-part of application No. 13/242,969, filed on Sep. 23, 2011.

(60) Provisional application No. 61/620,999, filed on Apr. 6, 2012.

(30) Foreign Application Priority Data

Mar. 3, 2011 (TW) .............................. 100107060 A (51) Int. Cl.
*H04W 36/00* (2009.01)
*H04W 60/00* (2009.01)
*H04W 4/22* (2009.01)

(52) U.S. Cl.
CPC ................ *H04W 60/00* (2013.01); *H04W 4/22* (2013.01)

(58) Field of Classification Search
None
See application file for complete search history.

(56) References Cited

U.S. PATENT DOCUMENTS

| | | | |
|---|---|---|---|
| 2007/0165573 A1* | 7/2007 | Hietalahti | 370/331 |
| 2008/0188221 A1* | 8/2008 | Hashimoto et al. | 455/435.1 |
| 2008/0194254 A1* | 8/2008 | Balon et al. | 455/433 |
| 2009/0036143 A1* | 2/2009 | Martin et al. | 455/456.2 |
| 2009/0305666 A1* | 12/2009 | Tian et al. | 455/410 |
| 2010/0075658 A1* | 3/2010 | Hou et al. | 455/422.1 |
| 2010/0144307 A1* | 6/2010 | Wu | 455/404.1 |
| 2010/0297979 A1* | 11/2010 | Watfa et al. | 455/404.1 |
| 2011/0021212 A1* | 1/2011 | Chen et al. | 455/456.3 |
| 2011/0256876 A1* | 10/2011 | Kim | 455/445 |
| 2012/0178449 A1* | 7/2012 | Liao | 455/435.2 |

OTHER PUBLICATIONS

3rd Generation Partnership Project; NAS protocol for EPS; Stage 3 (3GPP TS 24.301 v9.5.0 (Dec. 2010)).*

* cited by examiner

*Primary Examiner* — Suhail Khan (74) *Attorney, Agent, or Firm* — Winston Hsu; Scott Margo (57) ABSTRACT

A mobile communication device with a wireless module and a controller module is provided. The wireless module performs wireless transceiving to and from a first service network. The controller module transmits a location update request message to a first cellular station of the first service network via the wireless module, and receives a location update rejection message, which comprises a rejection cause indicating a network related failure, from the first cellular station via the wireless module. Also, the controller module transmits another location update request message to a second cellular station of the first service network via the wireless module in response to the location update rejection message. Particularly, the first cellular station and the second cellular station belong to a first location area and a second location area, respectively.

8 Claims, 7 Drawing Sheets

MOBILE COMMUNICATION DEVICES AND LOCATION REGISTRATION METHODS

CROSS REFERENCE TO RELATED APPLICATIONS

This is a continuation-in-part of U.S. application Ser. No. 13/242,969 filed 2011 Sep. 23 and claims priority of U.S. Patent Application No. 61/620,999 filed on 2012 Apr. 6, and which is included in its entirety herein by reference.

BACKGROUND OF THE INVENTION

1. Field of the Invention

The invention generally relates to the field of mobile communications, and more particularly, to methods for speeding up location registration procedures, enabling the mobile communication devices to switch away from a problematic tracking area to another normal-service tracking area for performing location registration procedures to obtain mobile communication services.

2. Description of the Prior Art

In a typical mobile communications environment, a user equipment (UE) may communicate voice and/or data signals with one or more service networks. The wireless communications between the UE and the service networks maybe in compliance with various wireless technologies, such as the Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA 2000) technology, Time Division-Synchronous Code Division Multiple Access (TD-SCDMA) technology, Worldwide Interoperability for Microwave Access (WiMAX) technology, Long Term Evolution (LTE) technology, and others.

In general, a UE is configured to camp on a cellular station with best reception, and perform a location registration procedure via the cellular station to register itself to the service network to which the cellular station belongs. Specifically, during the location registration procedure in GSM and UMTS, the UE transmits the registration information, such as the identification of the UE and the current location area of the UE, to the service network. During the location registration procedure in LTE, the UE transmits the registration information, such as the identification of the UE and the current tracking area of the UE, to the service network. According to the registration information, the service network may determine whether to accept the location registration request from the UE. For example, the service network may determine the subscription status of the UE according to the identification of the UE, or may determine whether the service capacity is enough for serving the UE according to the current location of the UE. After that, the service network may reply to the UE with the result of the location registration request. If the location registration request is accepted, the UE may obtain mobile communication services, such as the voice and/or data services, from the service network.

Note that, the operator of the service network may periodically practice maintenance or update of the cellular stations belonging to a specific location area or tracking area. In this situation, the UEs remaining in the specific location area or tracking area may fail to register themselves to the service network and may not be able to obtain mobile communication services from the service network. According to the release 5 to 7 of the 3GPP TS 24.008 specification (referred to herein as the TS 24.008 specification), the release 11 of the 3GPP TS 24.301 specification (referred to herein as the TS 24.301 specification), and releases 6 and 7 of the 3GPP TS 23.122 specification (referred to herein as the TS 23.122 specification), when the location registration request of a UE is rejected by a service network, the UE is configured to retransmit the location registration request associated with the same tracking area for a predetermined number of times until the registration request is accepted. However, if the UE is still rejected after retransmitting the location registration request for the predetermined number of times, the UE is then configured to release the Radio Resource (RR) connection, i.e., the connection between the UE and the service network, and enter the Mobility Management (MM) idle mode. When in the MM idle mode, the UE has to wait for a period of time before being ready to re-perform the location registration procedure or perform a Public Land Mobile Network (PLMN) search procedure. Disadvantageously, whether re-performing the location registration procedure or performing a PLMN search procedure, a great deal of time is required for the UE to successfully register itself to the service network and obtain mobile communication services. As a result, real-time user experience may be hard to guarantee due to the break-off of the mobile communication services.

SUMMARY OF THE INVENTION

Accordingly, embodiments of the invention provide mobile communication devices and location registration methods for efficiently performing location registration procedures. In one aspect of the invention, a mobile communication device comprising a wireless module and a controller module is provided. The wireless module is arranged for performing wireless transceiving to and from a first service network. The controller module is arranged for transmitting a location update request message to a first cellular station of the first service network via the wireless module, and receiving a location update rejection message from the first cellular station via the wireless module. Also, the controller module is arranged for transmitting another location update request message to a second cellular station of the first service network via the wireless module in response to the location update rejection message. Particularly, the location update rejection message comprises a rejection cause indicating a network related failure, and the first cellular station and the second cellular station belong to a first location area and a second location area, respectively.

In another aspect of the invention, a location registration method, applied in a mobile communication device wirelessly connected to a first service network, is provided. The location registration method comprises the steps of transmitting a location update request message to a first cellular station of the first service network, receiving a location update rejection message from the first cellular station, wherein the location update rejection message comprises a rejection cause indicating a network related failure, and transmitting another location update request message to a second cellular station of the first service network in response to the location update rejection message, wherein the first cellular station and the second cellular station belong to a first location area and a second location area, respectively.

Other aspects and features of the invention will become apparent to those with ordinary skill in the art upon review of the following descriptions of specific embodiments of the mobile communication devices and the location registration methods.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

The invention can be more fully understood by reading the subsequent detailed description and examples with references made to the accompanying drawings, wherein.

DETAILED DESCRIPTION

The following description is of the best-contemplated mode of carrying out the invention. This description is made for the purpose of illustrating the general principles of the invention and should not be taken in a limiting sense. The 3GPP specifications are used to teach the spirit of the invention, and the invention is not limited thereto.

Figure 1:
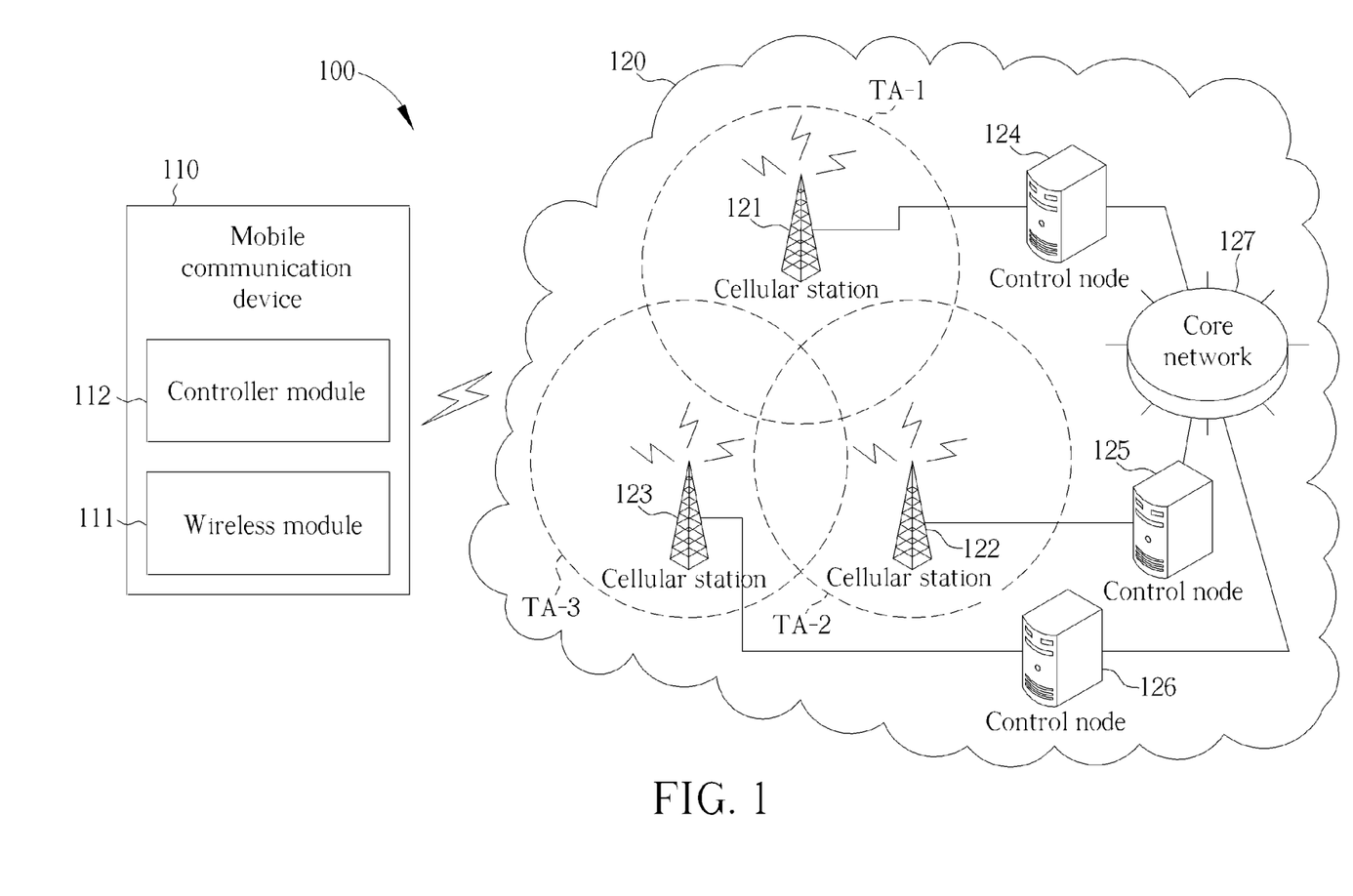
FIG. 1 is a block diagram illustrating a mobile communication environment according to an embodiment of the invention.

FIG. 1 is a block diagram illustrating a mobile communication environment according to an embodiment of the invention. In the mobile communication environment 100, the mobile communication device 110 is wirelessly connected to the service network 120 via the air interface for providing wireless intercommunications. In one embodiment, the service network 120 may be, but not limited to, an LTE system. The service network 120 may include the cellular stations 121 to 123, the control nodes 124 to 126, and the core network 127, wherein the cellular stations 121 to 123 are controlled by the control nodes 124 to 126, respectively, to provide the functionality of wireless transceiving for the service network 120. Particularly, the cellular stations 121 to 123 belong to the tracking areas TA-1 to TA-3 of the service network 120, respectively. Although not shown in FIG. 1, the tracking areas TA-1 to TA-3 may include other cellular stations in addition to the cellular stations 121 to 123. In other words, each of the control nodes 124 to 126 is configured to control all of the cellular stations belonging to a respective tracking area. The mobile communication device 110 comprises a wireless module 111 arranged for performing the functionality of wireless transceiving. To further clarify, the wireless module 111 may include a baseband unit (not shown in FIG. 1) and a radio frequency (RF) unit (not shown in FIG. 1). The baseband unit may contain multiple hardware devices to perform baseband signal processing, including analog to digital conversion (ADC)/digital to analog conversion (DAC), gain adjusting, modulation/demodulation, encoding/decoding, and so on. The RF unit may receive RF wireless signals, convert the received RF wireless signals into baseband signals, which are processed by the baseband unit, or receive baseband signals from the baseband unit and convert the received baseband signals to RF wireless signals, which are later transmitted. The RF unit may also contain multiple hardware devices to perform radio frequency conversion. For example, the RF unit may include a mixer to multiply the baseband signals with a carrier oscillated in the radio frequency of the wireless communications system, wherein the radio frequency may be 900 MHz, 1900 MHz, or 2100 MHz utilized in the UMTS systems, or may be 900 MHz, 2100 MHz, or 2.6 GHz utilized in LTE systems, or others depending on the radio access technology (RAT) in use. Also, the mobile communication device 110 may include a controller module 112 arranged for controlling the operation of the wireless module 111 and other functional components, such as a display unit and/or keypad unit (not shown in FIG. 1) serving as the MMI (man-machine interface), a storage unit storing the program codes of applications or communication protocols, or others. To be more specific, the controller module 112 is arranged for controlling the wireless module 111 to perform location registration procedures with the service network 120.

Figure 2:
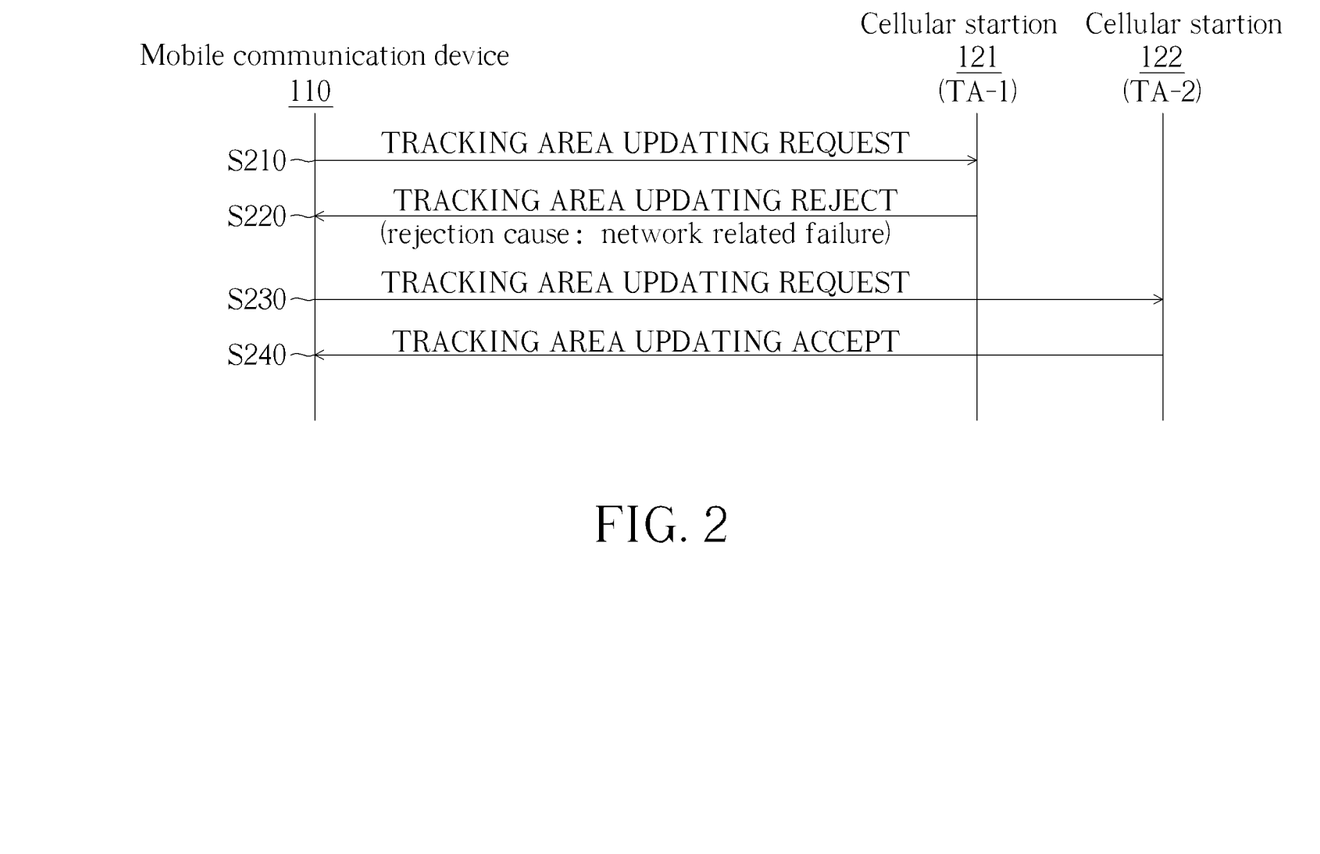
FIG. 2 is a message sequence chart illustrating a method of performing a location registration procedure in the mobile communication environment of FIG. 1 according to an embodiment of the invention.

FIG. 2 is a message sequence chart illustrating a method of performing a location registration procedure in the mobile communication environment 100 according to an embodiment of the invention. In this embodiment, the service network 120 is an LTE system and the mobile communication device 110 is a UE in compliance with the TS 24.301 and TS 23.122 specifications and/or other specifications associated with LTE technology. Particularly, the mobile communication device 110 is located in an area where the signal coverage of the cellular stations 121 to 123 overlaps. That is, the mobile communication device 110 may receive wireless signals from all of the cellular stations 121 to 123. Assuming that the detected signal strength of the cellular station 121 is greater than those of the cellular stations 122 and 123, the mobile communication device 110 is configured to transmit a TRACKING AREA UPDATING REQUEST message to the cellular station 121 (step S210). The TRACKING AREA UPDATING REQUEST message may include information associated with the UE identification and the current tracking area of the mobile communication device 110. The UE identification may be the International Mobile Subscriber Identity (IMSI), Temporary Mobile Subscriber Identity (TMSI), Packet-TMSI (P-TMSI), International Mobile Equipment Identity (IMEI), or IMEI and Software Version (IMEISV) of the mobile communication device 110. The current tracking area may be indicated by the tracking area number of the cellular station 121, i.e., TA-1, which the mobile communication device 110 may receive from the broadcast system information of the cellular station 121. In this embodiment, if the cellular station 121 is under maintenance or conducting system updates, the service network 120 may reply the mobile communication device 110 with a TRACKING AREA UPDATING REJECT message via the cellular station 121 (step S220). The TRACKING AREA UPDATING REJECT message may include a rejection cause indicating a network related failure. Specifically, the TRACKING AREA UPDATING REJECT message may include a data field named "reject cause" with a value set to "Network Failure". Since the mobile communication device 110 is located in an area where the signal coverage of the cellular stations 121 to 123 overlaps, the mobile communication device 110 may subsequently transmit another TRACKING AREA UPDATING REQUEST message to the cellular station 122 or 123 in response to the TRACKING AREA UPDATING REJECT message having a rejection cause indicating a network related failure. Assuming both the cellular stations 122 and 123 can provide normal services, the controller module 112 may transmit another TRACKING AREA UPDATING REQUEST message to one of the cellular stations 122 and 123 depending on respective signal strengths. In the embodiment illustrated in FIG. 1, assuming that the signal strength of the cellular station 122 is greater than that of the cellular station 123, the mobile communication device 110 is configured to transmit another TRACKING AREA UPDATING REQUEST message to the cellular station 122 (step S230). When receiving the TRACKING AREA UPDATING REQUEST message, the service network 120 may reply the mobile communication device 110 with a TRACKING AREA UPDATING ACCEPT message via the cellular station 122 (step S240). The location registration procedure ends when the mobile communication device 110 receives the TRACKING AREA UPDATING ACCEPT message.

Figure 3:
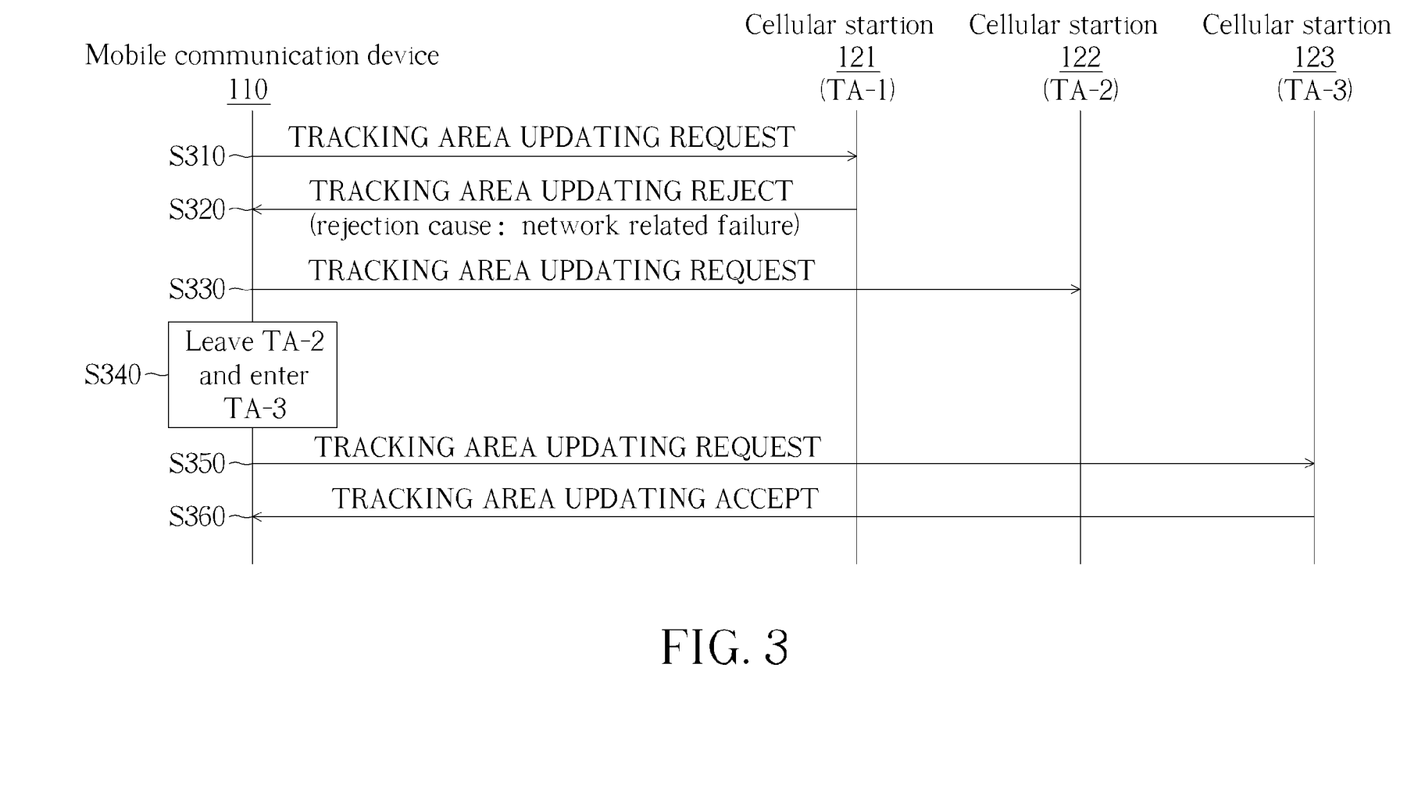
FIG. 3 is a message sequence chart illustrating a method of performing a location registration procedure in the mobile communication environment of FIG. 1 according to another embodiment of the invention.

FIG. 3 is a message sequence chart illustrating a location registration procedure method in the mobile communication environment 100 according to yet another embodiment of the invention. Similar to FIG. 2, the mobile communication device 110 is located in an area where the signal coverage of the cellular stations 121 to 123 overlaps. Also assuming that the detected signal strength of the cellular station 121 is greater than those of the cellular stations 122 and 123, the controller module 112 is configured to transmit a TRACKING AREA UPDATING REQUEST message to the cellular station 121 (step S310). In this embodiment, if the cellular station 121 (and/or the control node 124) is under maintenance or conducting system updates, the mobile communication device 110 may subsequently receive a TRACKING AREA UPDATING REJECT message from the cellular station 121 (step S320). Assuming that the signal strength of the cellular station 122 is greater than that of the cellular station 123, the mobile communication device 110 is configured to transmit another TRACKING AREA UPDATING REQUEST message to the cellular station 122 in response to the TRACKING AREA UPDATING REJECT message having a rejection cause indicating a network related failure (step S330). In the embodiment illustrated in FIG. 3, the mobile communication device 110 may somehow leave the tracking area of the cellular station 122 (denoted as TA-2) and enter the tracking area of the cellular station 123 (denoted as TA-3) before receiving a response message from the cellular station 122 (step S340). In response to the movement, the controller module 112 is configured to transmit another TRACKING AREA UPDATING REQUEST message to the cellular station 123 via the wireless module 111 (step S350). Since the cellular station 123 can provide normal services, the service network 120 may reply the mobile communication device 110 with a TRACKING AREA UPDATING ACCEPT message via the cellular station 123 (step S360). The location registration procedure ends when the mobile communication device 110 receives the TRACKING AREA UPDATING ACCEPT message.

Figure 4:
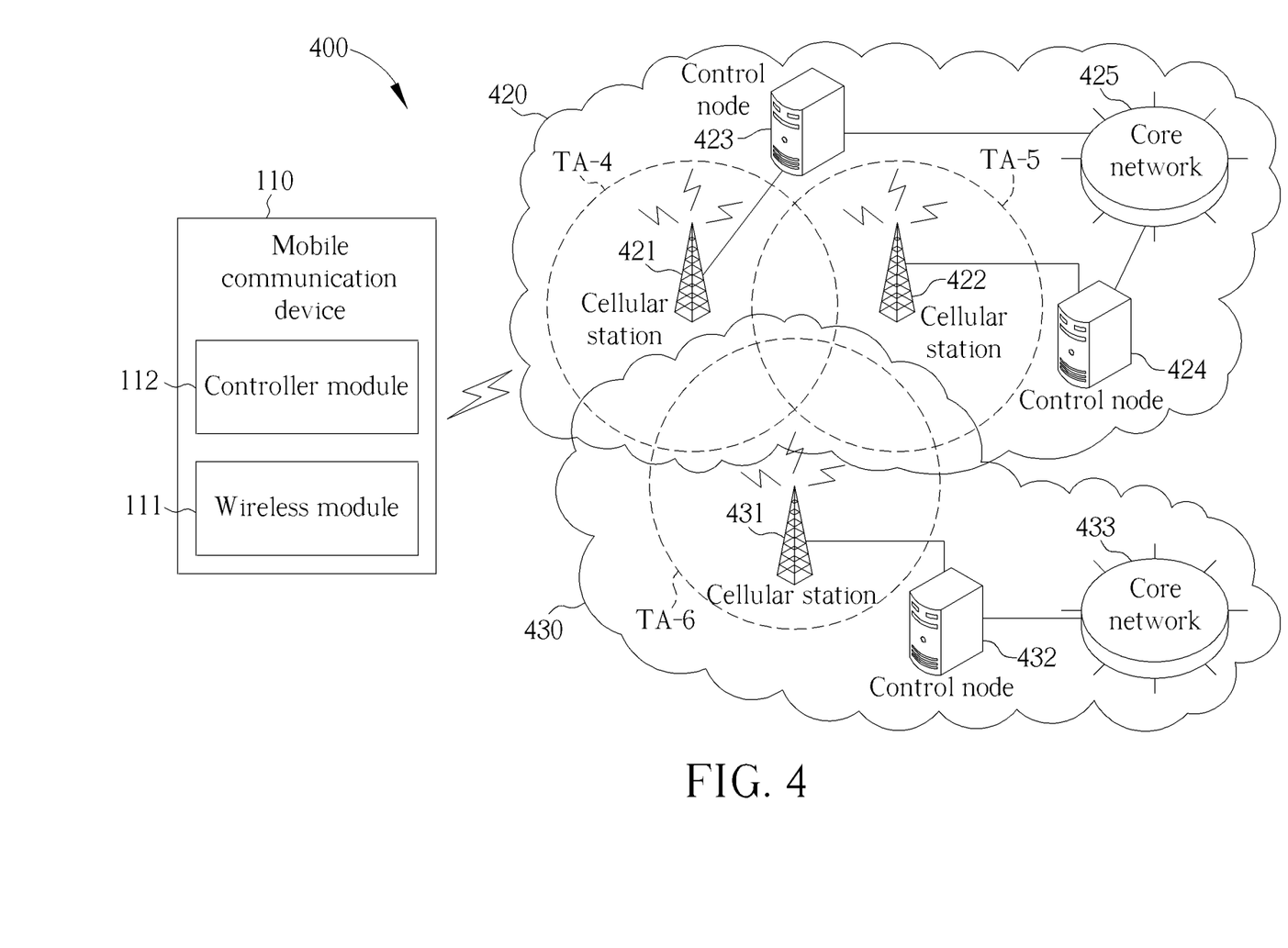
FIG. 4 is a block diagram illustrating a mobile communication environment according to another embodiment of the invention.

FIG. 4 is a block diagram illustrating a mobile communication environment according to another embodiment of the invention. In the mobile communication environment 400, the mobile communication device 110 may be wirelessly connected to the service network 420 or 430 via the air interface for providing wireless intercommunications. Particularly, the service networks 420 and 430 belong to different PLMNs, i.e., deployed and maintained by different operators. In the embodiment illustrated in FIG. 4, both of the service networks 420 and 430 may be LTE systems. To further clarify, the service network 420 may include the cellular stations 421 and 422, the control nodes 423 and 424, and the core network 425, wherein the cellular stations 421 and 422 are controlled by the control nodes 423 and 424, respectively, to provide the function of wireless transceiving for the service network 420. The service network 430 may include the cellular station 431, the control node 432, and the core network 433, wherein the cellular stations 431 is controlled by the control node 432 to provide the function of wireless transceiving for the service network 430. Though not shown in FIG. 5, the tracking areas TA-4 to TA-6 may include other cellular stations in addition to the cellular stations 421, 422, and 431. That is, each of the control nodes 423, 424, and 432 is configured to control all of the cellular stations belonging to a respective tracking area.

Figure 5:
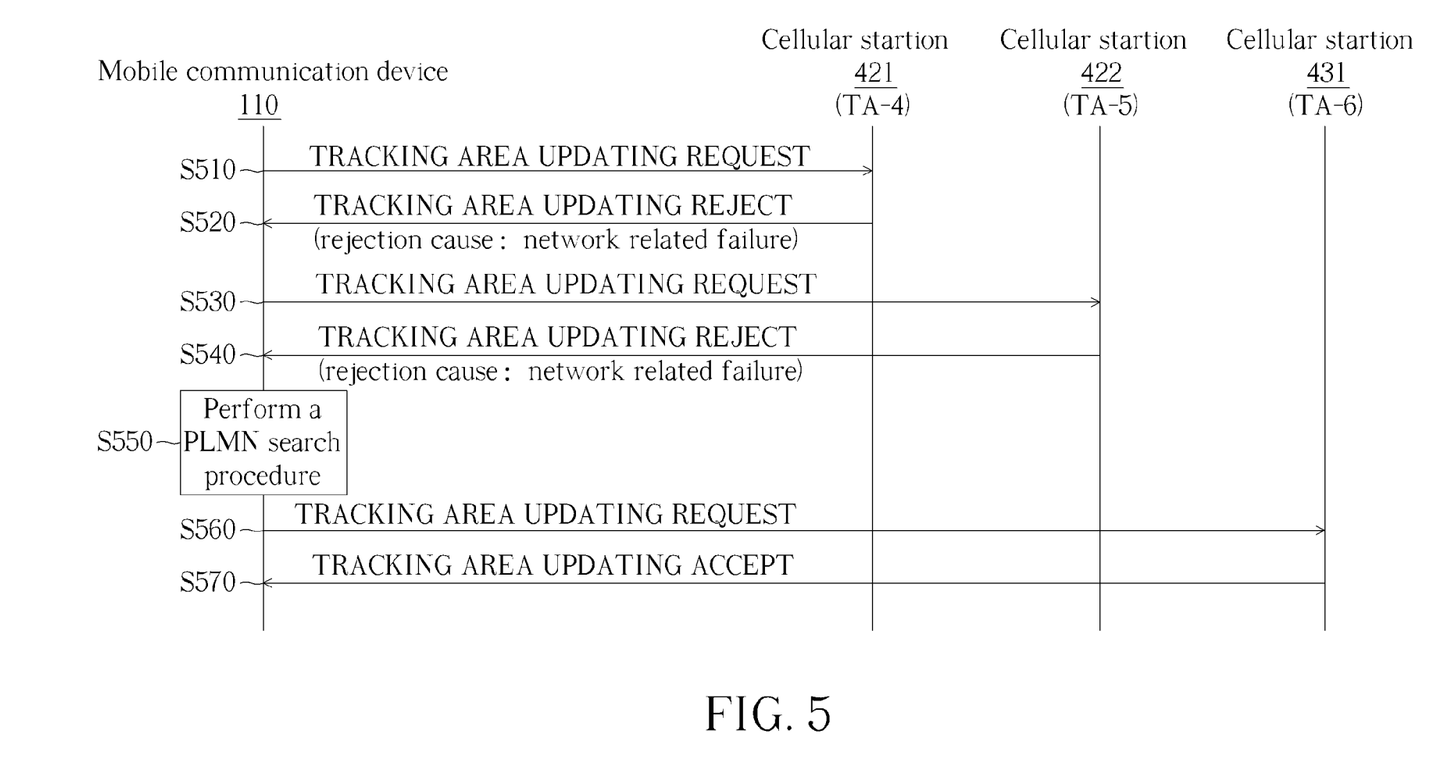
FIG. 5 is a message sequence chart illustrating a method of performing a location registration procedure in the mobile communication environment of FIG. 4 according to an embodiment of the invention.

FIG. 5 is a message sequence chart illustrating a location registration procedure in the mobile communication environment 400 according to an embodiment of the invention. In this embodiment, assume that the mobile communication device 110 is located in an area where the signal coverage of the cellular stations 421, 422, and 431 overlaps, and the cellular stations 421 and 422 are under maintenance or conducting system updates while the cellular station 431 is in normal service. Under such circumstance, the controller module 112 is configured to transmit a TRACKING AREA UPDATING REQUEST message to the cellular station 421 (step S510). Assuming that the cellular station 421 (and/or the control node 423) is under maintenance or conducting system updates, the mobile communication device 110 may subsequently receive a TRACKING AREA UPDATING REJECT message from the cellular station 421 (step S520). Specifically, the TRACKING AREA UPDATING REJECT message may include a rejection cause indicating a network related failure. Next, the controller module 112 is configured to transmit another LOCATION UPDATING REQUEST message to the cellular station 422 (step S530). Since the cellular station 422 (and/or the control node 424) is also under maintenance or conducting system updates, the service network 420 may reply the mobile communication device 110 with a TRACKING AREA UPDATING REJECT message via the cellular station 422 (step S540). If the mobile communication device 110 is rejected after trying to register on all cellular stations in the service network 420, the controller module 112 is configured to perform a PLMN search procedure via the wireless module 111 (step S550). If the controller module 112 can access another PLMN (such as the service network 430) in the PLMN search procedure, the controller module 112 is then configured to transmit another TRACKING AREA UPDATING REQUEST message to the cellular station 431 (step S560). Since the cellular station 431 is in normal services, the service network 430 may reply the mobile communication device 110 with a TRACKING AREA UPDATING ACCEPT message via the cellular station 431 (step S570). The location registration procedure ends when the mobile communication device 110 receives the TRACKING AREA UPDATING ACCEPT message.

Figure 6:
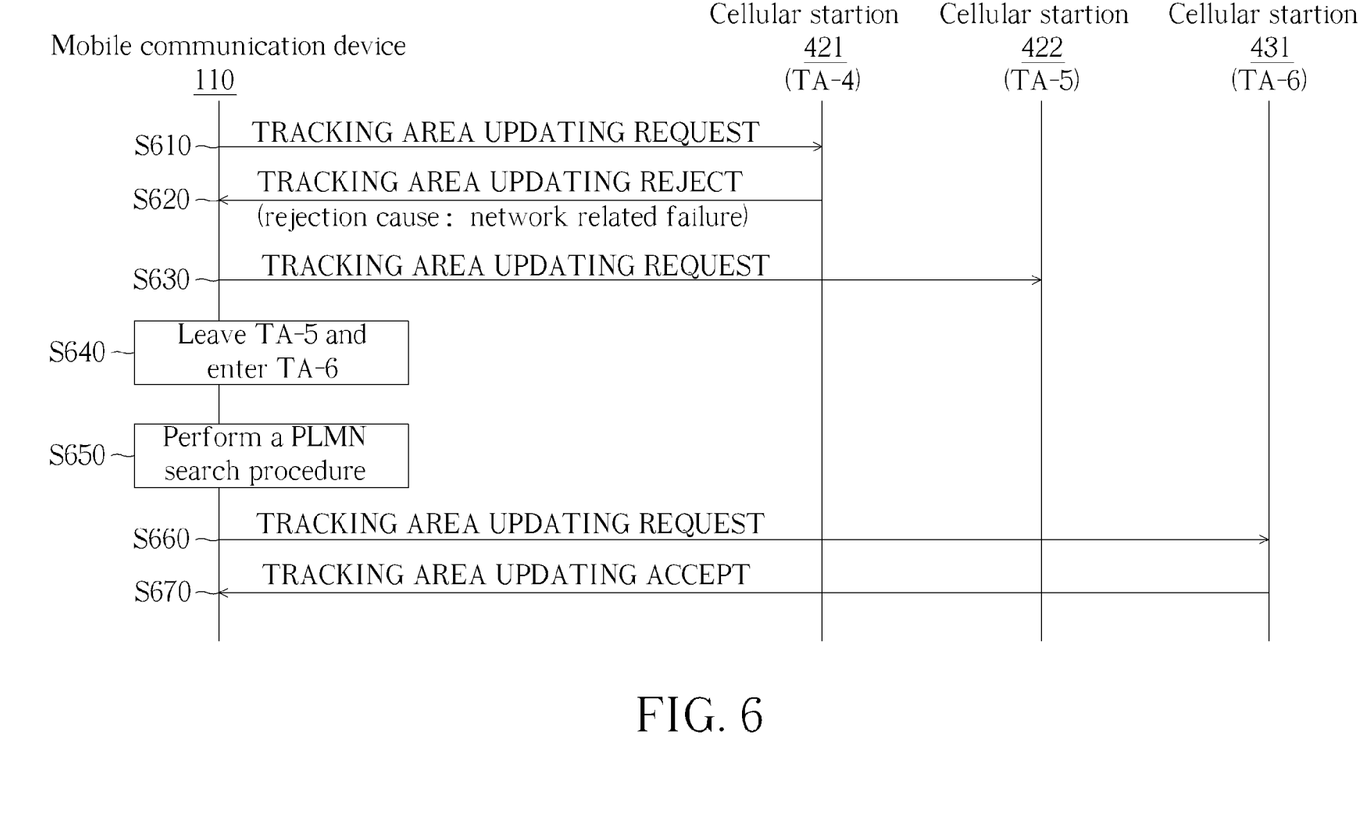
FIG. 6 is a message sequence chart illustrating a method of performing a location registration procedure in the mobile communication environment of FIG. 4 according to another embodiment of the invention.

FIG. 6 is a message sequence chart illustrating a location registration procedure in the mobile communication environment 400 according to yet another embodiment of the invention. In this embodiment, assume that the mobile communication device 110 is located in an area where the signal coverage of the cellular stations 421, 422, and 431 overlaps, and the cellular stations 421 and 422 are under maintenance or conducting system updates while the cellular station 431 is in normal service. Under such circumstance, the controller module 112 is configured to transmit a TRACKING AREA UPDATING REQUEST message to the cellular station 421 (step S610). Assuming that the cellular station 421 (and/or the control node 423) is under maintenance or conducting system updates, the mobile communication device 110 may subsequently receive a TRACKING AREA UPDATING REJECT message from the cellular station 421 (step S620). Specifically, the TRACKING AREA UPDATING REJECT message may include a rejection cause indicating a network related failure. Next, the controller module 112 is configured to transmit another LOCATION UPDATING REQUEST message to the cellular station 422 (step S630). In the embodiment illustrated in FIG. 6, the mobile communication device 110 may somehow leave the tracking area of the cellular station 422 (denoted as TA-5) and enter the tracking area of the cellular station 423 (denoted as TA-6) before receiving a response message from the cellular station 122 (step S640). In response to the movement, the controller module 112 is configured to transmit another TRACKING AREA UPDATING REQUEST message to the cellular station 432 via the wireless module 111 (step S650). Since the cellular station 431 can provide normal services, the service network 120 may reply the mobile communication device 110 with a TRACKING AREA UPDATING ACCEPT message via the cellular station 431 (step S660). The location registration procedure ends when the mobile communication device 110 receives the TRACKING AREA UPDATING ACCEPT message.

Figure 7:
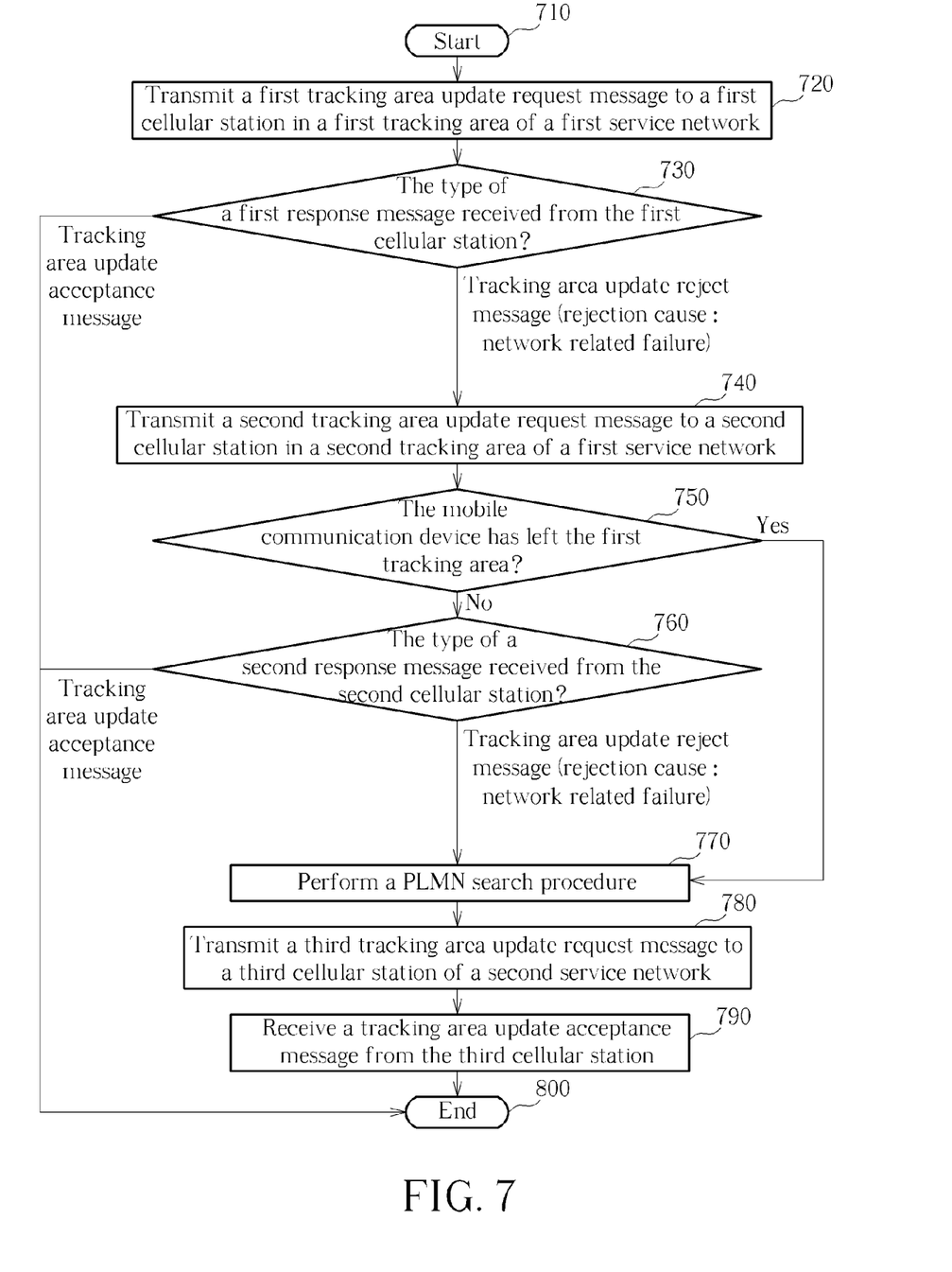
FIG. 7 is a flow chart illustrating a location registration method in the mobile communication environment according to embodiments of the invention.

FIG. 7 is a flow chart illustrating a location registration method in the mobile communication environment 100 or 400 according to embodiments of the invention. The flowchart includes the following steps:

Step 710: start.

Step 720: transmit a first tracking area update request message to a first cellular station in a first tracking area of a first service network; execute step 730.

Step 730: determine the type of a first response message received from the first cellular station: if the first response message is a tracking area update reject message having a rejection cause indicating a network related failure, execute step 740; if the first response message is a tracking area update acceptance message, execute step 800.

Step 740: transmit a second tracking area update request message to a second cellular station in a second tracking area of a first service network; execute step 750.

Step 750: determine if the mobile communication device has left the first tracking area: if yes, execute step 770; if no, execute step 760.

Step 760: determine the type of a second response message received from the second cellular station: if the second response message is a tracking area update reject message having a rejection cause indicating a network related failure, execute step 770; if the second response message is a tracking area update acceptance message, execute step 800.

Step 770: perform a PLMN search procedure; execute step 780.

Step 780: transmit a third tracking area update request message to a third cellular station of a second service network detected in the PLMN search procedure; execute step 790.

Step 790: receive a tracking area update acceptance message from the third cellular station; execute step 800.

Step 800: end.

Note that, the location update request message may be a LOCATION UPDATING REQUEST message in an LTE system, the location update rejection message may be a LOCATION UPDATING REJECT message in an LTE system, and the location update acceptance message may be a LOCATION UPDATING ACCEPT message in an LTE system.

While the invention has been described by way of example and in terms of preferred embodiment, it is to be understood that the invention is not limited thereto. Those who are skilled in this technology can still make various alterations and modifications without departing from the scope and spirit of this invention. For example, in addition to the LTE technology, the location registration method may also be applied for mobile communications devices and service networks which are in compliance with the LTE-Advanced technology, or any evolutionary technology of the LTE technology family. Therefore, the scope of the invention shall be defined and protected by the following claims and their equivalents.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mobile communication device, comprising:
a wireless module, arranged for performing wireless transceiving to and from a first service network; and
a controller module configured to:
transmit a first tracking area update request message to a first cellular station in a first tracking area of a first service network via the wireless module;
receive a first tracking area update rejection message from the first cellular station via the wireless module; and
in response to the first tracking area update rejection message when the first tracking area update rejection message comprises a first rejection cause indicating a first network related failure, transmit a second tracking area update request message to a second cellular station in a second tracking area of the first service network via the wireless module before the mobile communication device performs a Public Land Mobile Network (PLMN) search procedure, wherein the first rejection cause is a "Cause #17-Network failure" defined in a 3GPP TS 24.301 specification.

2. The mobile communication device of claim 1, wherein the controller module is further arranged for performing the Public Land Mobile Network (PLMN) search procedure when receiving a second tracking area update rejection message from the second cellular station after transmitting the second tracking area update request message via the wireless module, wherein the second tracking area update rejection message comprises a second rejection cause indicating a second network related failure.

3. The mobile communication device of claim 2, wherein the controller module is further arranged for determining if the mobile communication device has left the first tracking area and performing the Public Land Mobile Network (PLMN) search procedure for detecting a second service network associated with a current location of the mobile communication device.

4. The mobile communication device of claim 2, wherein the controller module is further arranged for transmitting a third tracking area update request message to a third cellular station in the second service network.

5. A location registration method of performing tracking area updating (TAU) in a mobile communication device, comprising:
transmitting a first tracking area update request message to a first cellular station in a first tracking area of a first service network;

receiving a first tracking area update rejection message from the first cellular station, wherein the first tracking area update rejection message comprises a first rejection cause indicating a first network related failure and the first rejection cause is a "Cause #17-Network failure" defined in a 3GPP TS 24.301 specification; and transmitting a second tracking area update request message to a second cellular station in a second tracking area of the first service network in response to the first rejection cause before the mobile communication device performs a Public Land Mobile Network (PLMN) search procedure.

6. The location registration method of claim 5, further comprising:

performing the Public Land Mobile Network (PLMN) search procedure when receiving a second tracking area update rejection message from the second cellular station after transmitting the second tracking area update request message, wherein the second tracking area update rejection message comprises a second rejection cause indicating a second network related failure.

7. The location registration method of claim 5, further comprising:

determining if the mobile communication device has left the first tracking area; and performing the Public Land Mobile Network (PLMN) search procedure for detecting a second service network associated with a current location of the mobile communication device.

8. The location registration method of claim 7, further comprising:

transmitting a third tracking area update request message to a third cellular station in the second service network.

* * * * *